US008667052B2

(12) United States Patent
Dezonno et al.

(10) Patent No.: US 8,667,052 B2
(45) Date of Patent: Mar. 4, 2014

(54) BUSINESS RULE WEB SERVICE

(75) Inventors: Anthony J. Dezonno, Bloomingdale, IL (US); Sandy Biggam, Mt. Prospect, IL (US)

(73) Assignee: Aspect Software, Inc., Chelmsford, MA (US)

( * ) Notice: Subject to any disclaimer, the term of this patent is extended or adjusted under 35 U.S.C. 154(b) by 912 days.

(21) Appl. No.: 11/017,457

(22) Filed: Dec. 20, 2004

(65) Prior Publication Data

US 2006/0147024 A1    Jul. 6, 2006

(51) Int. Cl.
| | |
|---|---|
| G06F 15/16 | (2006.01) |
| H04M 3/00 | (2006.01) |
| H04M 3/51 | (2006.01) |
| H04L 12/28 | (2006.01) |
| H04M 3/527 | (2006.01) |

(52) U.S. Cl.
CPC ......... *H04M 3/5191* (2013.01); *H04L 12/2854* (2013.01); *H04M 3/527* (2013.01)
USPC ..................................... 709/203; 379/265.02

(58) Field of Classification Search
CPC . H04M 3/527; H04M 3/5191; H04L 12/2854
USPC ..................................... 709/203; 379/265.02
See application file for complete search history.

(56) References Cited

U.S. PATENT DOCUMENTS

| | | |
|---|---|---|
| 5,555,179 A | 9/1996 | Koyama et al. |
| 5,765,033 A | 6/1998 | Miloslavsky |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,134,318 A | 10/2000 | O'Neil |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,188,761 B1 * | 2/2001 | Dickerman et al. ...... 379/265.01 |
| 6,295,551 B1 | 9/2001 | Roberts et al. |

(Continued)

OTHER PUBLICATIONS

Edd Dumbill "XML Watch: Bird's-eye BEEP", http://www.ibm.com/developerworks/webservices/library/x-beep/, Dec. 1, 2001.*

*Primary Examiner* — Boris Gorney
(74) *Attorney, Agent, or Firm* — Husch Blackwell LLP

(57) ABSTRACT

A method and apparatus for providing transaction services to one of a plurality of organizations where such transaction services are provided for servicing contacts with clients of the organization through an independently operated contact processing system having a communication connection with the organization through the Internet. The method includes the steps of a contact controller of the organization providing contact control instructions for servicing the contacts to a control interface of the contact processing system and a web services publisher exchanging control information between the organization and contact controller through the Internet for the servicing the contacts with the clients of the organization.

38 Claims, 2 Drawing Sheets

(56) References Cited

U.S. PATENT DOCUMENTS

| | | |
|---|---|---|
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,463,148 B1 * | 10/2002 | Brady .................. 379/265.01 |
| 6,584,191 B1 | 6/2003 | McPartlan et al. |
| 6,611,498 B1 | 8/2003 | Baker et al. |
| 6,697,858 B1 * | 2/2004 | Ezerzer et al. ............. 709/224 |
| 6,732,156 B2 | 5/2004 | Miloslavsky |
| 6,744,878 B1 | 6/2004 | Komissarchik et al. |
| 7,254,641 B2 * | 8/2007 | Broughton et al. ........... 709/240 |
| 2001/0024497 A1 * | 9/2001 | Campbell et al. ........ 379/265.09 |
| 2002/0042823 A1 * | 4/2002 | DeBettencourt et al. ..... 709/224 |
| 2003/0018702 A1 * | 1/2003 | Broughton et al. ........... 709/202 |
| 2004/0062380 A1 * | 4/2004 | Delaney ................... 379/265.02 |
| 2004/0083195 A1 * | 4/2004 | McCord et al. ................. 706/47 |
| 2005/0034079 A1 * | 2/2005 | Gunasekar et al. ........... 715/753 |
| 2005/0044197 A1 * | 2/2005 | Lai ............................... 709/223 |
| 2006/0111092 A1 * | 5/2006 | Harris et al. ................. 455/418 |

\* cited by examiner

BUSINESS RULE WEB SERVICE

FIELD OF THE INVENTION

The field of the invention relates to communication services and more particularly to automatic contact distribution.

BACKGROUND OF THE INVENTION

Automatic call distributors (ACDs) used within telephone communication systems are known. Such systems are typically used by organizations to serve large numbers of callers. Typically, calls are directed to a common telephone number and distributed to agents based upon some criteria (e.g., agent idle time).

ACDs can typically process both inbound and outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While ACDs work well, they are expensive to own and operate. However, small businesses must often mount sales campaigns to develop new products or to move stale products. In order to reduce costs, small businesses may often contract with a telemarketing organization to handle the additional communications workload.

While contracting with a telemarketing organization is effective, it is difficult to gauge the success or such efforts because the small business is not directly involved and because the telemarketing organization's approach towards customer service may be different than that of the small business. Accordingly, a need exists for more flexible methods of telemarketing.

SUMMARY

A method and apparatus for providing transaction services to one of a plurality of organizations where such transaction services are provided for servicing contacts with clients of the organization through an independently operated contact processing system having a communication connection with the organization through the Internet. The method includes the steps of a contact controller of the organization providing contact control instructions for servicing the contacts to a control interface of the contact processing system and a web services publisher exchanging control information between the organization and contact controller through the Internet for the servicing the contacts with the clients of the organization.

DETAILED DESCRIPTION OF AN ILLUSTRATED EMBODIMENT

Figure 1:
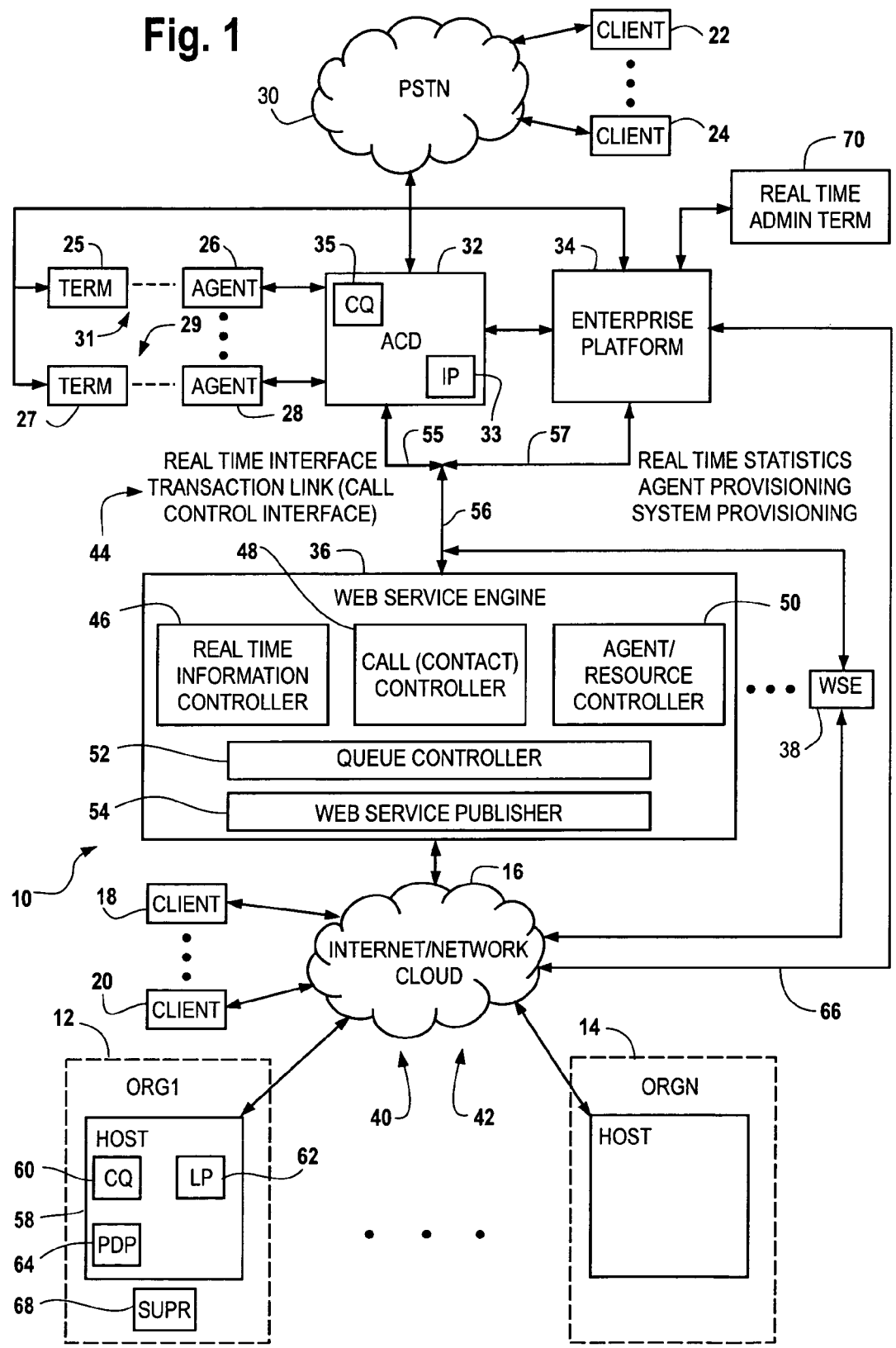
FIG. 1 is a block diagram of a transaction processing system, shown in a context of use, in accordance with an illustrated embodiment of the invention.

FIG. 1 is a block diagram of a transaction services provider system 10 under an illustrated embodiment of the invention. The system 10 may be used to provide transaction services to any of a number of different organizations (e.g., small businesses) 12, 14 that subscribe to receive telemarketing help (i.e., transaction services) through the system 10 in a confidential, cost-effective manner.

In order to promulgate the agenda of the organization with its clients 18, 20, 22, 24, an organization 12, 14 may publish, by advertising or otherwise, one or more telephone numbers, universal resource locators (URLs), instant messaging (IM) addresses or e-mail addresses that identify communication paths to the organization. Clients 18, 20, 22, 24 may use these communication path identifiers to initiate contacts with the organization. Alternatively, the organization may purchase communication path identifiers of potential clients and place outgoing contacts directed towards the clients 18, 20, 22, 24.

Contacts with clients 18, 20, 22, 24 may be handled by a contact processing system 44 through one or more agent stations 29, 31. The agent stations 29, 31 may be used to sequentially handle contacts associated with any number of different organizations 12, 14. Once a target organization 12, 14 within a group of subscribing organizations 12, 14 is determined, a contact is routed to an agent station 29, 31, and instructions from the target organization 12, 14 for handling the contact may be presented on a terminal 25, 27 of the agent. The agent station 29, 31 may also be provided with a telephone console 26, 28 for handling contacts arriving through the PSTN 30.

In general, the system 10 is structured such that the activities of any one organization 12, 14 are confidential from every other organization 12, 14. The contact processing system 44, in fact, may be owned and operated by an independent third party. In addition, the agents of the contact processing system 44 may be employees of the third party.

Under one illustrated embodiment, the term "independently operated contact processing system" means a contact processing system whose only relation with the organizations 12, 14 is contractual. The term "independently operated" does not mean owned or controlled by some common organization.

The confidentiality of the organizations 12, 14 may be maintained by the existence and simultaneous operation of a number of virtual private networks (VPNs) 40, 42. Each VPN 40, 42 used by an organization 12, 14 may include a host 58 of the organization 12, 14 and a separate web services engine 36, 38 used exclusively by the respective organization 12, 14 for handling calls through the contact processing system 44. The web services engine 36, 38 may function as a private interface with the contact processing system 44 that no other organization 12, 14 is allowed to access. The web services engine 36, 38, in turn, may function to control call handling through the contact processing system 44.

Within the web services engine 36, 38, a real time information controller 46 may issue commands and collect information (e.g., from the contact distributor 32, RTI link, real time administrator 70, etc.) through a control interface. As used herein, a control interface is an internal communication bus of the contact processing system 44 over which contact information and contact processing commands are exchanged (e.g., a Transaction Link of a Concerto Spectrum model ACD).

The issuance of commands and collection of information through the control interface by the real time information controller 46 may occur in response to requests brokered through a web service publisher 54. In this regard, an administrator 70 of the contact distribution system 44 may use a software development kit (SDK) to make real time state and status information available to the real time information controller 46 through the enterprise platform 34. The real time state and status information available from the enterprise platform may be published through the enterprise application SDK and web service publisher 54 for the benefit of one or more web service subscribers (i.e., organizations 12, 14).

Similarly, a call controller 48 within the web services engine 36, 38 provides the ability to generate and route contacts presented to or requested by a subscribing organization 12, 14. In this regard, a subscriber 12, 14 may enroll to receive information about inbound contacts to the contact processor 44 that meets certain criteria (e.g., contains a particular DNIS identifier). The subscriber 12, 14 may also provide instructions to the web services engine 36, 38 indicating how contacts meeting the criteria are to be handled. The call controller 48 may also receive commands from its respective organization 12, 14 for generating standard and predictive dialed telephony calls using the resources of the contact processor 44.

The web services engine 36, 38 may also include an agent resource controller 50 and queue controller 52. The agent resource controller 50 may generate and interpret agent and system configuration commands along with agent state change information, such as going available, and communicating both synchronous and asynchronous information to the web service subscriber 12, 14 for processing.

With regard to the agents 29, 31, the agent resource controller 50 may monitor and report on agent availability. As each agent signs in, the agent is added to an available agents list. As each agent signs out, or is assigned to handle a contact, the agent is removed from the available agents list.

The communication path used by the resource controller 50 for communicating with the contact processor 44 depends on the type of command being requested. Some commands will go through the Transaction Link interface 55, yet others will be sent through the enterprise platform interface 57 depending on the capabilities offered by the interface. Configuration information may be collected from the enterprise platform by issuing commands through an enterprise platform, software development kit (SDK) interface. Any command that can be executed through the SDK is available for use by the engine 36, 38 and is described in publicly available SDK documentation.

The queue controller 52 may function to queue contacts or agents. If no agent is available to handle a contact, then the contact may be added to a call queue based upon contact type.

Communication between the web services engine 36, 38 and the organization 12, 14 may be accomplished via use of a web service publisher 54. A supervisor 68 may select data elements available through the enterprise platform SDK and configure a web service publisher 54 to make the selected data elements available to applications within the host 58 of the subscriber 12, 14. For example, queue delay time may be made available from the contact processor 44 for publication on a webpage of the organization 12, 14 to inform potential callers of their possible time in queue when calling the organization 12, 14. Information may be passed in a XML or SIP based format or any allowable format permitted by the interface between web service publisher 36, 38 and host 58.

In general, the web services engine 36, 28 includes a number of computer applications 46, 48, 50, 52 that interact with the contract processor 44 and that control how a call is processed. The web service publisher 54 functions as a control interface that resides between those applications 46, 48, 50, 52 and the host 58 of the organization 12, 14.

Turning first to the web service publisher 54, the web services publisher 54 may operate on a number of different layers. A first layer may include a service transport layer. The service transport layer may be responsible for transporting message between applications within the web services engine 36, 38 and applications within the organization 12, 14. The service transport layer may transport information using hypertext transport protocol (HTTP), simple mail transfer protocol (SMTP), file transfer protocol (FTP) or block entensible exchange protocol (BEEP).

A second layer may include an XML messaging layer. This layer is responsible for encoding messages in a common XML format so that the messages can be understood at each end. The second layer may use XML-Remote Procedure Call (XML-RPC) or SOAP.

In general, XML-RPC is a relatively simple protocol that uses XML messages to perform remote procedure calls. Requests are encoded in XML and sent via HTTP POST. XML responses are embedded in the body of the HTTP response. Because XML-RPC is platform independent, it allows diverse applications to communicate. For example, a Java client can communicate with a Perl server using XML-RPC.

Verification that an organization 12, 14 is authorized to operate within a particular VPN 40, 42 may be accomplished in a number of ways. On a first level, HTTP includes built-in support for Basic and Digest authentication, and the organization's data can therefore be protected in much the same manner as HTML documents are protected. In addition, since XML-RPC operates primarily on top of HTTP, the XML-RPC messages can be encrypted via the Secure Sockets Layer (SSL).

In general, the organization 12, 14 may control the processing of a contact using a combination of XML-RPC requests and responses. In this regard, an XML-RPC request may be a combination of an XML message and HTTP headers. The XML message may use a data typing structure to pass parameters and additional information identifying which application is being called. The HTTP headers provide a wrapper for passing the request over the Internet.

Each XML-RPC request may contain a single XML message, whose root element is a method call element. Each method call element contains an application name and a parameter element. The application name identifies the name of the application to be called. Each parameter element includes a parameter element or a list of parameter elements.

An XML-RPC response may be similar to requests with a few differences. If a request was successful (i.e., the application was found, executed correctly, and returned results), then the XML-RPC response may appear much like a request, except that the method call element may be replaced by a method response element and there is no application name element. The XML-RPC response may also contain a response parameter returned by the requested application.

Turning now to the system 10, as a whole, as contacts arrive, the contacts may be detected by the contact distributor 32 (in the case of telephone calls) or by the enterprise platform 34 (in the case of instant messaging or e-mails). Where the contact is a telephone call arriving from a client 22, 24, an identification processor 33 within the contact distributor 32 may detect arrival of the call through the PSTN 30, and collect any call associated information (e.g., DNIS, ANI, etc.). The identification processor 33 may also open a record containing the call associated information and assign a unique call identifier as an identifier of the call and of the file. The identification processor 33 may also send a contact arrival message to the enterprise platform 34.

In the case of an Internet contact from clients 18, 20, the enterprise platform 34 may receive the contact. The enterprise platform 34 may retrieve contact associated information (i.e., destination and source identifiers) from the "from" and "to" fields of the contact and transfer the call associated information to the ACD 32. The ACD 32 may open a record, as described above, and transfer a copy of the record back to the enterprise platform 34.

Figure 2:
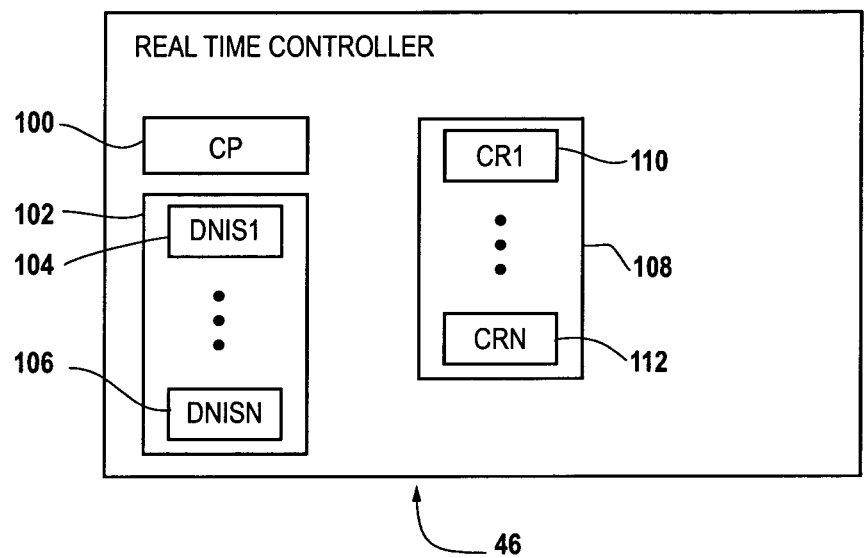
FIG. 2 is a block diagram of the real time controller of FIG. 1.

In order for the system 10 to begin processing contacts for an organization 12, a host 58 operated by the organization 12 may send a remote procedure call to a contact processor 100 (FIG. 2) within the real-time information controller 46. In response, the contact processor 100 may begin to monitor the control interface 56 to detect the arrival of calls directed to the organization (e.g., organization 12).

In order to detect contacts directed to the organization 12, the contact processor 100 may receive and analyze each contact record. On a first level, the contact processor 100 may recover a destination address (i.e., DNIS information for telephone calls, Internet address for Internet calls, etc.) from the retrieved call records and compare the destination address with a set of destination addresses 104, 106 associated with its respective organization 12. When a match is found, the contact processor 100 may save a local copy of the record 110, 112 in a memory 108 and send a copy of the record to the host 58. To send a copy of the record, the contact processor 100 may encode the record into an XML-RPC response and transfer the contact record to a context processor 60 within the host 58. If no match is found, then the contact processor 100 discards the record.

The context processor 60 may function to determine a type of contact involved for purposes of selecting an agent or group of agents to handle the contact. In this regard, the context processor 60 may make the determination based upon a number of factors. On a first level, the destination information received along with the call may provide a first level indicator of the type of call involved.

In addition, source information may be used to identify existing clients as a further indicator of the type of call involved. For example, in the case of a telephone call, ANI may be used to identify existing clients. The identification of an existing client allows the host 58 to retrieve client records as a further indication of the type of contact involved.

Figure 3:
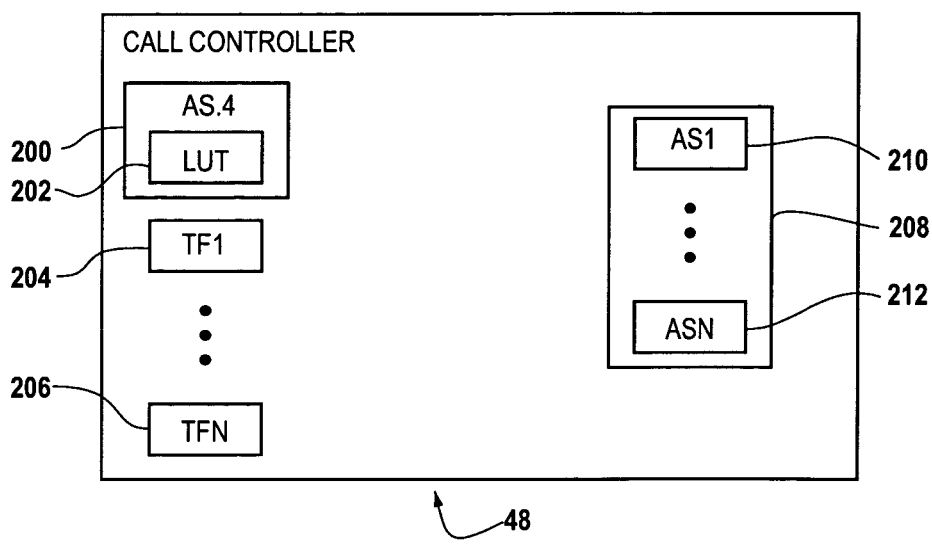
FIG. 3 is a block diagram of the call controller of FIG. 1.

Once a type of contact is determined, the context processor 60 may transfer a remote procedure call to an agent selection application 200 (FIG. 3) within the call controller 48 of the web services engine 36, 38. The remote procedure call may include (as included parameters) the call identifier of the record and an identifier of the contact type.

Within the agent selection application 200, the contact type may be used as a search term for purposes of entering a lookup table 202 to retrieve a set of agent skills necessary for the proper handling of the contact. In addition to providing a set of agent skills, the lookup table 202 may also identify one or more text files 204, 206 that may be used by a selected agent in handling the contact.

Once a set of required agent skills have been identified, the agent selection application 200 may search an agent skills list 208 to identify an available agent (e.g., agent 29) to handle the contact. If a qualified agent 29, 31 can be identified, then the agent selection application 200 may compose and send an agent assignment instruction to the contact processing system 44 requesting assignment of the agent 29 to the contact. The agent selection application 200 may also retrieve and send an appropriate text file 204, 206 through the enterprise platform 34 to a terminal 27 of the agent 29. The text file may be displayed on the terminal 27 of the agent 29 at the same instant as contact delivery. The text tile 204, 206 may provide text to be read to the client 22, 24 or an outline of procedures to be followed in handling the contact.

Alternatively, the selected agent 29 may be busy when the contact arrived. In this case, the assigned contact may be placed in one or more contact queues 35 pending availability of the selected agent 29.

In order to monitor the performance of the contact processing system 44, the real time information controller 46 may periodically issue status messages (inquiries) requesting information about contact queues 35 from the contact distributor 44. For example, some contact processing distributors 44 support the "INFORM HOST ON CALL STATUS" message. Contact status information that may be available using the INFORM HOST ON CALL STATUS may include the call identifier, telescript information, called party number, calling party number, queued agent groups (1-10 groups), overflow information, agent position, logical workstation number, trunk port ID, trunk group number, previous position of a call, previous call information, conference call identifier, on-hold call identifiers, barged-in contact identifiers, telescript digit variables and host information.

In addition, the software development kit (SDK) available on many enterprise platforms 34 of contact distribution systems 44 can also be used to provide other information under a standardized set of information requests. Examples of agent group information may include agent group number, number of calls queued, number of call abandoned per time period, number of position calls handled, number of out calls, number of auxiliary in-calls, number of auxiliary out-calls, number of calls dequeued, number of dial attempts, number of barge-ins, number of assists, number of calls transferred out, maximum queue length, longest delay, delay time to abandoned, delay time to handled, agent position call talk time, agent outcall talk time, auxiliary in-call talk time, auxiliary out-call talk time, agent position call-work time, agent outcall call-work time, agent out call hold time, agent position call hold time, auxiliary in-calls hold time, auxiliary out-calls hold time, primary agent signed-in time, secondary agent signed-in time, primary agent plugged-in time, secondary agent plugged-in time, available time, unavailable time, barge-in time, assist time, dial time, primary agent cumulative calls handled, primary agent cumulative talk time, primary agent cumulative call work time, primary agent cumulative call hold time, secondary agent cumulative calls handled, secondary agent cumulative talk time, secondary agent cumulative call work time, secondary agent cumulative call hold time and call-back time. Examples of real time information may include application number handling calls, cumulative calls offered (daily), cumulative calls held (daily), cumulative calls abandoned, cumulative calls handled, logging information such as the number of application calls offered or the number of application calls held, number of application calls offered, total time of application calls offered, number of calls delayed, total time of calls in an application, number of applications calls held, number of calls transferred in, number of calls routed in, number of calls in in-call talk, number of calls in in-call call work, number of calls in in-call hold time, current overflow in requests accept, current overflow in calls, current overflow out attempts, current overflow out calls, current routed/diverted OFFNET calls. Examples of delayed call profile data include delay by application number, number of application calls held, application calls abandoned in a delay array, application calls handled in a delay array, maximum calls delayed, longest delay, application delay time to abandoned and application delay time to handled. Examples of real-time longest application delay data include number of calls by application number and number of calls by longest application delay.

Organizations 12, 14 may simultaneously subscribe for transaction services through a number of different transaction services provider systems 10, where each provider system 10 has its own contact processing system 44 and web service engine 36, 38. A loading processor 62 may activate a remote procedure call to poll each provider system 10 for contact center operation statistics in order to determine the most appropriate contact center 10 to which to route a transaction.

Data on queue lengths may be collected by a remote procedure call made by a predictive dialing processor 64 to a queue controller 52. The queue controller 52 may collect the data by directly issuing a set of data requests over the control interface 56 or indirectly by obtaining the data through the real time controller 46. Reported queue lengths may be compared to threshold values and where the queue length meets some threshold criteria, the predictive dialing processor 64 may make a remote procedure call that includes a contact target (client) path identifier as an included parameter that is transferred as part of the procedure call.

The remote procedure calls to the web services engine 36, 38 may cause the controller 48 to format the subscriber service requests from the organization 12, 14 into appropriate ACD commands such as Make Dial requests, Make Media requests, or Make Predictive call requests. Another function that may be implemented (using the system 10) is the ability to perform a call back to a client 18, 20, 22, 24 in response to a message left with the contact distribution system 10.

In this regard, a supervisor 68 of the organization 12, 14 may supply information to the host 58 regarding the phone number to dial, the time to dial the number and the agent or resource to be used to dial the transaction. The host 58 may then issue the appropriate dial command at the specified time to the contact processing system 44 through the web services engine 36, 38 to accomplish the purpose of the contact.

In other illustrated embodiments, the organization may also route contacts (e.g., e-mail, chat sessions, VoIP sessions, etc.) to the contact distribution system 44 via an external connection 66. As the contacts are received by the enterprise platform 34, a call record may be opened and the contact assigned to an agent 29, 31 as described above.

In another illustrated embodiment, the applications 62, 54 of each organization 12, 14 (and even the organizations themselves) may each operate within their own individual VPNs through a single web services engine. In this case, each application 62, 64 (and organization) may represent a different account within the web services engine with different privileges.

A specific embodiment of method and apparatus for providing transaction services has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing transaction services to a plurality of different subscribing organizations where such transaction services are provided for servicing contacts with clients of the plurality of subscribing organizations through an independently operated contact processing system having a communication connection with the subscribing organizations through the Internet, such method comprising the steps of:

a respective contact controller, of a plurality of contact controllers, within each of a plurality of exclusive web service engines, each controller exclusive to a respective one of the plurality of subscribing organizations and each controller providing exclusive control instructions for servicing the contacts of each respective subscribing organization, the control instructions provided through a control interface of the contact processing system, the contact processing system operated independently of the subscribing organizations and each exclusive web service engine serving as a private interface with the contact processing system with exclusive access by the respective subscribing organization; and a web services publisher, of a plurality of web service publishers, within each of the plurality of exclusive web service engines, exchanging contact control information bidirectionally between the respective subscribing organization and the respective contact controller through the Internet, including publishing queue information to a respective subscriber website, for the exclusive servicing of the contacts with the clients of each respective subscribing organization such that activities of each of the plurality of subscribing organizations are kept confidential from every other subscribing organization of the plurality of subscribing organizations.

2. The method of providing transaction services as in claim 1 further comprising a real time controller of each respective subscribing organization collecting contact information about a client of the respective subscribing organization from the control interface of the contact processing system.

3. The method of providing transaction services as in claim 2 further comprising the web services publisher exchanging control information with the real time controller.

4. The method of providing transaction services as in claim 3 further comprising defining the exchanged control information as remote procedure calls.

5. The method of providing transaction services as in claim 4 further comprising sending the remote procedure calls to a web services engine containing the contact controller, real time controller and web services publisher.

6. The method of providing transaction services as in claim 5 further comprising the plurality of web services engines each simultaneously operating as a virtual private network for a respective one of the plurality of subscribing organizations to maintain confidentiality of each of the plurality of subscribing organizations.

7. The method of providing transaction services as in claim 1 further comprising a second organization receiving transaction services through the contact processing system through a respective second virtual private network.

8. The method of providing transaction services as in claim 1 further comprising the web services publisher exchanging information with the subscribing organizations under one of the group consisting of a hypertext transfer protocol, a simple mail transfer protocol, a file transfer protocol and a blocks extensible exchange protocol.

9. The method of providing transaction services as in claim 1 further comprising the real time controller retrieving agent group information from the contact processing system.

10. The method of providing transaction services as in claim 1 further comprising the real time controller retrieving contact status information from the contact processing system.

11. The method of providing transaction services as in claim 1 further comprising the real time controller retrieving real time information from the contact processing system.

12. The method of providing transaction services as in claim 1 further comprising the real time controller retrieving queuing information from the contact processing system.

13. The method of providing transaction services as in claim 1 further comprising the subscribing organizations transferring a make call instruction to the real time controller.

14. The method of providing transaction services as in claim 1 further comprising the organization transferring a contact type to the real time controller.

15. The method of providing transaction services as in claim 2 further comprising the real time controller collecting DNIS and ANI information from contacts detected on the real time control interface.

16. The method of providing transaction services as in claim 15 further comprising the real time controller comparing the collected DNIS information with a predetermined DNIS identifier and discarding any contact information with DNIS information that does not match the predetermined DNIS information.

17. The method of providing transaction services as in claim 2 further comprising the real time controller transferring the collected information of a contact to a host of the respective subscribing organization.

18. A non-transitory computer readable medium storing instructions which when executed by a processor perform a method for providing transaction services to a plurality of different subscribing organizations where such transaction services are provided for servicing contacts with clients of the plurality of subscribing organizations through an independently operated contact processing system having a communication connection with the subscribing organization through the Internet, comprising the steps of:
a respective contact controller, within each of a plurality of web service engines, each exclusive to a respective one of the plurality of subscribing organizations, providing control instructions to a control interface of the independently operated contact processing system for servicing the contacts of the subscribing organizations and wherein each respective web service engine serves as a private interface with the contact processing system with exclusive access by a respective one of the subscribing organizations; and
a web service publisher, within each of the plurality web service engines, exchanging control information bidirectionally between the respective organization and the respective contact controller through the Internet including queue information, for the exclusive servicing of the contacts with the clients of the respective subscribing organization.

19. The non-transitory computer readable medium as in claim 18 further comprising instructions for implementing the step of a real-time controller, associated with each web service engine, collecting contact information about clients of respective subscribing organization from the control interface of the contact processing system.

20. The non-transitory computer readable medium as in claim 19 further comprising instructions for causing the web service publisher to exchange control information with the real-time controller.

21. The non-transitory computer readable medium as in claim 20 further comprising instructions for defining the exchanged control information as remote procedure calls.

22. An apparatus for providing transaction services to a plurality of different subscriber organizations where such transaction services are provided for servicing contacts with clients of the subscriber organizations through an independently operated contact processing system having a communication connection with the subscriber organizations through the Internet, such apparatus comprising:
a plurality of exclusive web service engines and a respective contact controller within each of the plurality of exclusive web service engines, each exclusive to a respective one of the plurality of subscriber organizations that provides contact control instructions for servicing the contacts of each respective subscriber organization to a control interface of the contact processing system, the contact processing system operated independently of the subscriber organizations and wherein each respective web service engine serves as a private interface with the contact processing system with exclusive access by the respective subscriber organization; and
a web services publisher, of a plurality of web service publishers, within each of the plurality of exclusive web service engines, that exchanges contact control information bidirectionally between the respective subscriber organization and the respective contact controller through the Internet, including queue information, for exclusive servicing of the contacts with the clients of the respective subscriber organization, such that activities of each of the plurality of subscribing organizations are kept confidential from every other subscribing organization of the plurality of subscribing organizations.

23. The apparatus for providing transaction services as in claim 22 further comprising a real time controller of each respective subscriber organization collecting contact information about a client of the clients of the respective subscriber organization from the control interface of the contact processing system.

24. The apparatus for providing transaction services as in claim 23 further comprising the web services publisher exchanging control information with the real time controller.

25. The apparatus for providing transaction services as in claim 24 further comprising defining the exchanged control information as remote procedure calls.

26. The apparatus for providing transaction services as in claim 25 further comprising sending the remote procedure calls to a web services engine containing the contact interface, contact controller and web services publisher.

27. The apparatus for providing transaction services as in claim 26 further comprising each web services engine operating as a virtual private network of the respective subscriber organization.

28. The apparatus for providing transaction services as in claim 22 further comprising a second organization receiving transaction services through the contact processing system through a respective, second virtual private network.

29. The apparatus for providing transaction services as in claim 22 further comprising the web services publisher exchanging information with the subscriber organizations under one of the group consisting of a hypertext transfer protocol, a simple mail transfer protocol, a file transfer protocol and a blocks extensible exchange protocol.

30. The apparatus for providing transaction services as in claim 22 further comprising agent group information retrieved by the real time controller from the contact processing system.

31. The apparatus for providing transaction services as in claim 22 further comprising contact status information retrieved by the real time controller from the contact processing system.

32. The apparatus for providing transaction services as in claim 22 further comprising real time information retrieved by the real time controller from the contact processing system.

33. The apparatus for providing transaction services as in claim 22 further comprising queuing information retrieved by the real time controller from the contact processing system.

34. The apparatus for providing transaction services as in claim 22 further comprising a make call instruction transferred by the organization to the real time controller.

35. The apparatus for providing transaction services as in claim 22 further comprising a contact type transferred by the organization to the real time controller.

36. The apparatus for providing transaction services as in claim 23 further comprising DNIS and ANI information collected by the real time controller from contacts detected on the real time control interface.

37. The apparatus for providing transaction services as in claim 36 wherein the real time controller further comprising programming features that compares the collected DNIS information with a predetermined DNIS identifier and discarding any contact information with DNIS information that does not match the predetermined DNIS information.

38. The apparatus for providing transaction services as in claim 23 wherein the real time controller further comprising programming features that transfer the collected information of a contact to a host of the respective subscriber organization.

* * * * *